April 26, 1949.  M. P. VAN CAMP ET AL  2,468,143
PROBE FOR DETECTING AND LOCATING SOURCES
OF ELECTROMAGNETIC ENERGY
Filed Nov. 3, 1944

INVENTOR.
JOSEPH L. McFARLAND
MARGUERITE P. VAN CAMP
BY William D. Hall.
ATTORNEY Patented Apr. 26, 1949

2,468,143

UNITED STATES PATENT OFFICE 2,468,143

PROBE FOR DETECTING AND LOCATING SOURCES OF ELECTROMAGNETIC ENERGY

Marguerite P. Van Camp, Detroit, and Joseph L. McFarland, Royal Oak, Mich.

Application November 3, 1944, Serial No. 561,798

6 Claims. (Cl. 175—183)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to probes and more particularly to an electrical probe for the location and isolation of interference in electrical and radio apparatus.

The objects of the present invention include the provision of an improved interference locating electrical probe for spotting zones of radio frequency interference in and about radio interference generating apparatus; of a probe having multi-directional characteristics that make it unnecessary to rotate the probe in order to locate various sources of radio frequency interference; of a probe of improved sensitivity that is concentrated in a small, compact and slender construction that permits its insertion into small recesses that have been inaccessible to commercial probes that have been available heretofore; of a probe that is of improved simplicity in construction and in mode of operation, permitting its use by non-technical personnel, and that is simple of assembly so that it may be manufactured rapidly and inexpensively with a minimum of apparatus, operations and expense; of a probe that is provided with an insulating sleeve that protects it against undue damage, wear and fouling by metal particles, moisture, dirt and the like, and that eliminates the possibilities of shorting pieces of electrical apparatus which may be contacted by it and which prevents the creation of undue static discharges should the probe contact any metal object; of a probe that is provided with mechanical attentuator that assists in the regulation of its radio frequency pick-up, and of a probe which may be easily, definitely set at a given distance from a given point and positively maintained at that distance.

With the above, and other objects in view, which will be apparent to those who are informed in the field of radio development and the location of trouble in radio and other equipment from the following description, illustrative embodiments of the invention are shown in the accompanying drawings, wherein.

The invention comprises an electrical probe, a tubular attenuator cooperating therewith, and a distance gauge and housing cooperatively mounted on the probe, the housing being provided with a scale which may cooperate with the attenuator to determine the desired position of the attenuator.

The probe proper comprises a tubular barrel 1 of brass or other non-magnetic material, one end of which is detachably secured by set screws or the like to one end of a transmission cable 2, which includes two inner conductors 21, 22 and an outer conductive shield 23.

Figure 1:
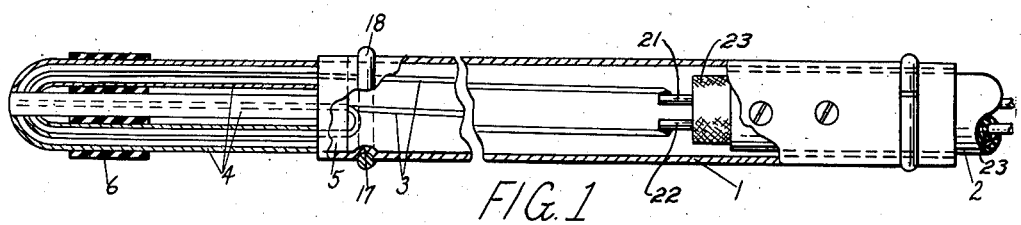
Fig. 1 is a side elevation (mostly broken away) of the probe assembly.
Figure 8:
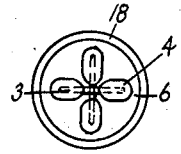
Fig. 8 is an end view of the probe.
Figure 9:
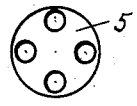
Fig. 9 is a front view of coil shield mounting base.

The operative or sensitive portion of the probe consists of a plurality of wire loops formed from one or more probe wires 3, and disposed as substantially identical elliptical loops approximately parallel with the longitudinal axis of the probe, as more clearly shown in Figs. 1 and 8 of the drawings. In the arrangement illustrated, one continuous probe wire 3 is used. The branches of these loops are shielded by enclosing non-magnetic tubes 4 firmly seated in respective bores in a suitable base, plug or disc 5, secured in the end of barrel 1 in any acceptable manner. The free ends of tubes 4 are curved inwardly toward the common center or probe axis, and tapered by being cut off at a 45° angle at each side.

These four tube ends closely approaching each other present, between them, in assembled relation (as shown in Fig. 8), an X-shaped passage or pickup slot crossed by the closed ends of loops of the probe wire or wires. As will be seen, these loops, at that point, may cross the axis of the barrel 1 diametrically from one shield tube 4 to another and at right angles to each other. It should be noted that the ends of the tubes 4 are spaced one from the other, leaving the probe wire exposed only as a cross at the probe end (see Fig. 8). This spaced relation of shield tubes 4 is positively maintained by a short, cylindrical spacer 6 of insulating material, longitudinally drilled for passage of the tubes 4 therethrough. It will be well understood that various other loop arrangements than that shown may be used, and also that a greater number of probe wires may be used. The ends of the probe wire or wires are carried back through the barrel 1 and are secured in any usual and well-known manner to the conductors of the transmission cable 2.

This construction provides narrow, elongated, intersecting, pencil-like, probe-wire loops in an exceptionally compact arrangement capable of ready insertion within very restricted spaces or openings wherein existing probes are incapable of use.

It is hardly necessary to state that the opposite end of the cable is connected in well-known manner to any acceptable indicating equipment.

Near each end of the barrel 1, circumferential grooves 17 are formed therein to seat resilient spring washers or split rings 18, which extend radially appreciably beyond barrel 1 to frictionally engage and support a protecting housing 9. Housing 9 is of insulating material such as a plastic of any one of several acceptable types. It is a cylinder of ample overall length to completely enclose the entire probe, and is closed at one end. Its opposite end may be longitudinally split to provide clamping jaws operable by the ring clamp 12. When in place, this housing 9 completely protects all parts of the probe against all objectionable metallic and electrical contacts, and amply protects it against possible short circuit, and against the entrance of moisture, metal particles, and other foreign matter.

Figure 2:
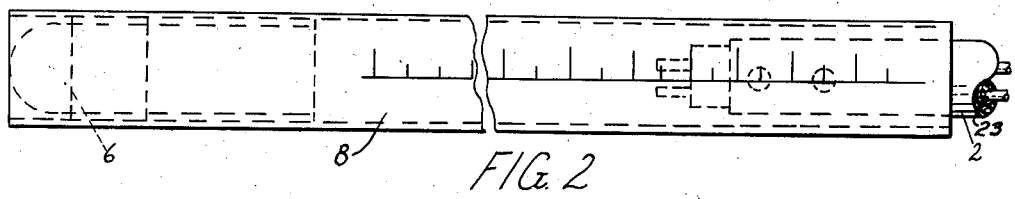
Fig. 2 is a side elevation of the probe assembly with distance gauge applied.
Figure 4:
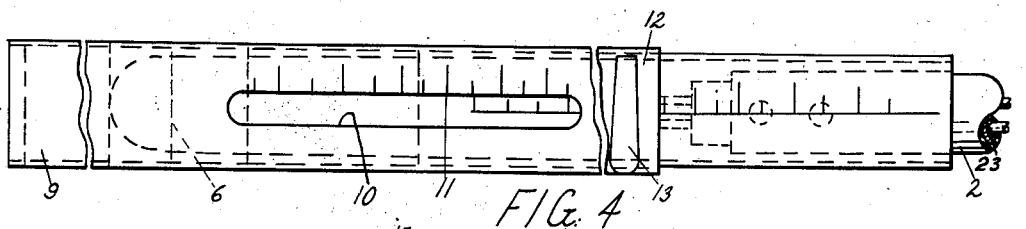
Fig. 4 is a side elevation of the probe assembly, distance gauge, and cooperating housing.

It is desired to use the probe at known distances from a source of interference. Accordingly a calibrated sleeve 8 of any acceptable insulating material is provided. This sleeve, when in operative position, extends the full length of and encircles the probe (Fig. 2). It is secured in place upon the barrel 1 by a set screw or the like (not shown), after first removing both of the split rings 18. Sleeve 8, when assembled on barrel 1, does not extend radially a greater distance than do split rings 18 when in place. Cooperating with this calibrated sleeve is the housing 9 of sufficient diameter to fit slidably over sleeve 8. It is provided, about midway of its length, with a longitudinal slot 10 having a calibrated edge or edges 11, for a purpose to be later disclosed. Preferably, the open end of housing 9 is longitudinally split to provide compressible jaws, in well-known manner. An ordinary ring clamp 12, with finger lever 13, suitably mounted on the split end, is used for clamping the housing at various positions of adjustment along the sleeve 8. In using the distance gauge, the probe is slidably adjusted within the housing 9, as desired. The distance of the sensitive end of the probe from the noise source is indicated by the reading of the exposed portion of the scale on the sleeve 8, the end of the housing 9 acting as a scale index or pointer, as shown in Fig. 4. The clamp 12 is then tightened to securely hold the probe in this position with its sensitive end spaced such distance from the inner end of housing 9 (see Fig. 4). By placing the closed end of housing 9 against the object from which the interfering noise emanates, the probe may be definitely held at that exact known distance from the source of noise. This may be repeated, definitely increasing or decreasing the distance as may be desired.

In many instances an attenuator will be desired. It serves to adjust or regulate the amount of radio frequency energy that may be picked up by the sensitive portion of the probe, and to correspondingly localize the same.

Figure 3:
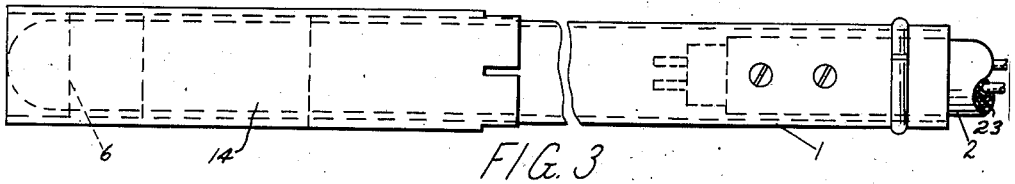
Fig. 3 is a side elevation with attenuator applied.
Figure 5:
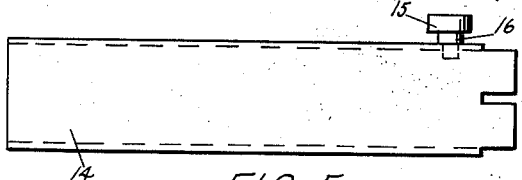
Fig. 5 is a side elevation of the attenuator.

The attenuator comprises a cylindrical attenuator tube 14 of brass or substantially equivalent non-magnetic material, of such inside diameter as to travel freely over barrel 1 after removal of the split ring 18 proximate to the sensitive end of the probe, and is used directly on the probe without sleeve 8 or after removal of sleeve 8 (see Figs. 3 and 5). Preferably, its inside diameter is such as to make a snug sliding fit about barrel 1 and it is of such thickness as to permit free movement within housing 9. One end may be longitudinally split to provide yielding spring action in assembling and in operation. It should be long enough to cover the full length of the sensitive part of the probe and still overlap the adjacent end of the tube 1 of the probe body. To secure the attenuator at various adjusted positions, a set screw 15 is provided. This screw is threaded through the side wall of the attenuator tube 14 and, in operation, binds against the barrel 1, locking the two together.

Figure 6:
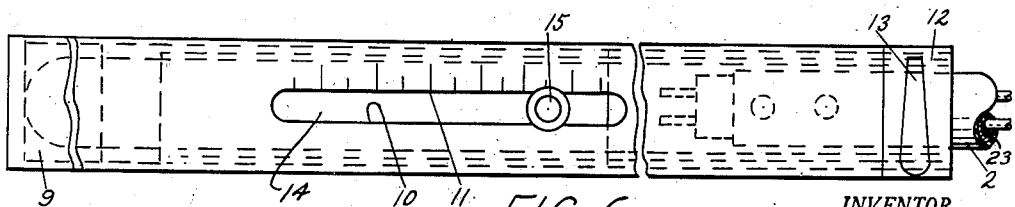
Fig. 6 is a side elevation of the probe assembly, with attenuator and housing in position.
Figure 7:
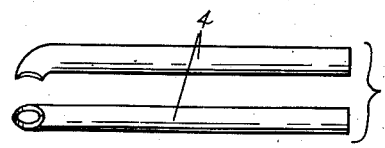
Fig. 7 is a side and bottom plan view of a coil shield.

In order to indicate the position of the attenuator relative to the sensitive portion of the probe, the scale 11 is provided. Set screw 15 is provided with an extended shank 16, adapted to travel freely in the slot 10 in housing 9. In using the attenuator, the sleeve 8 is removed, one of the split rings 18 is positioned upon the end of barrel 1 proximate to the cable 2, attenuator tube 14 is slipped over barrel 1, housing 9 is slipped over the attenuator tube 14, and along the probe to the full length of the probe where it is clamped, and set screw 15 is passed through slot 10 in housing 9 and threaded into tube 14 sufficiently to connect said tube and screw 15, but not far enough to bind the attenuator to the probe. Then the attenuator is moved lengthwise of the probe by the projecting knob end of the set screw 15. The attenuator is secured at any desired position by simply tightening screw 15. The relative position of the attenuator at any particular time is indicated by the position of the set screw 15 relative to the scale 11 (see Fig. 6).

It will be seen that the invention may be used as a probe protected by housing 9; as a probe with the calibrated sleeve 8 and housing; and as a probe with attenuator and housing 9.

It is thought that the construction, operation, and use of the invention will be clear from the preceding detailed description. Changes may be made in the construction, arrangement, and disposition of the several parts of the invention within the scope of the appended claims, and it is meant to include all such within this application wherein only one preferred form of the invention has been disclosed purely by way of illustration and with no thought or intent to, in any degree, limit the claims thereby.

Having thus described our invention, what we claim and desire to protect by Letters Patent is:

1. A device for coupling a source of stray electromagnetic energy to a utilization circuit comprising, a balanced shielded line, said line including an outer shielding conductor and two inner conductors, one end of said line being connected to said utilization circuit, a coupling member connected to the other end of said line, said coupling member including a tubular barrel of conducting non-magnetic material electrically continuous with said outer shielding conductor, four tubes of conducting non-magnetic material extending longitudinally from one end of said barrel, disposed substantially in quadrature about its axis and electrically continuous with said barrel, the distal ends of said tubes being bent inwardly into opposing spaced relationship, a continuous wire, insulated from said tubes and barrel, having its opposite ends electrically connected respectively to said inner conductors extending through said four tubes so as to form two serially connected loops whose planes are substantially perpendicular to each other so that said loops are substantially completely shielded by said tubes and the balance of said wire is shielded by said barrel.

2. A device as defined in claim 1 which includes an attenuator, said attenuator including a tubular member of conducting non-magnetic material encircling said barrel and electrically continuous therewith and slidable longitudinally thereon, so that said attenuator may be moved so as to have the outer end overlap, by varying distances, the four tubes and the loops of wire extending therethrough, so to vary the degree of coupling between said coupling member and said source.

3. A device as defined in claim 1 including a cylindrical housing closed at its outer end, of dielectric material, enclosing said coupling member.

4. A device as defined in claim 1 which includes an attenuator, said attenuator including a tubular member of conducting non-magnetic material encircling said barrel and electrically continuous therewith and slidable longitudinally thereon, so that said attenuator may be moved so as to have the outer end overlap, by varying distances, the four tubes and the loops of wire extending therethrough, so to vary the degree of coupling between said coupling member and said source, and a cylindrical housing closed at its outer end, of dielectric material, enclosing said coupling member and said attenuator and secured to said coupling member so as to allow full operation of said attenuator.

5. A device as defined in claim 1 above including a sleeve of dielectric material encircling said coupling member, a cylindrical housing, closed at its outer end, of dielectric material, encircling said coupling member and said sleeve and longitudinally slidable upon said sleeve, and a scale to indicate the longitudinal position of the housing relative to the coupling member.

6. A device for coupling a source of stray electromagnetic energy to a utilization circuit comprising, a balanced shielded line, said line including an outer shielding conductor and two inner conductors, one end of said line being connected to said utilization circuit, a coupling member connected to the other end of said line, said coupling member including a tubular barrel of conducting non-magnetic material electrically continuous with said outer shielding conductor, a plurality of pairs of tubes of conducting non-magnetic material extending longitudinally from one end of said barrel and electrically continuous with said barrel, the distal ends of the tubes of each pair being bent inwardly into opposing spaced relationship, a continuous wire, insulated from said tubes and barrel, having its opposite ends electrically connected respectively to said inner conductors and extending through said tubes so as to form a plurality of serially connected loops whose planes are angularly disposed with respect to each other so that said loops are substantially completely shielded by said tubes and the balance of said wire is shielded by said barrel.

MARGUERITE P. VAN CAMP.
JOSEPH L. McFARLAND.

REFERENCES CITED

The following references are of record in the file of this patent:

UNITED STATES PATENTS

| Number | Name | Date |
| --- | --- | --- |
| 1,920,156 | Hahnemann | July 25, 1933 |
| 2,106,771 | Southworth | Feb. 1, 1938 |
| 2,109,189 | Bly | Feb. 22, 1938 |
| 2,249,166 | Parker et al. | July 15, 1941 |
| 2,280,562 | Weagant | Apr. 21, 1942 |
| 2,343,684 | Mace | Mar. 7, 1944 |
| 2,365,207 | Moles | Dec. 19, 1944 |

FOREIGN PATENTS

| Number | Country | Date |
| --- | --- | --- |
| 419,783 | Great Britain | Nov. 19, 1934 |

OTHER REFERENCES

Short Wave and Television, April 1938, pages 669, 706, 707.